US012024942B2

(12) United States Patent
Huang

(10) Patent No.: US 12,024,942 B2
(45) Date of Patent: Jul. 2, 2024

(54) WINDOW SHADE AND OPERATING WAND THEREOF

(71) Applicant: Teh Yor Co., Ltd., New Taipei (TW)

(72) Inventor: Chin-Tien Huang, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 33 days.

(21) Appl. No.: 17/585,804

(22) Filed: Jan. 27, 2022

(65) Prior Publication Data

US 2022/0243529 A1 Aug. 4, 2022

Related U.S. Application Data

(60) Provisional application No. 63/144,581, filed on Feb. 2, 2021.

(51) Int. Cl.

*E06B 9/30* (2006.01)
*E06B 9/262* (2006.01)
*E06B 9/322* (2006.01)
*E06B 9/326* (2006.01)

(52) U.S. Cl.

CPC ................ *E06B 9/262* (2013.01); *E06B 9/30* (2013.01); *E06B 9/322* (2013.01); *E06B 9/326* (2013.01)

(58) Field of Classification Search

CPC ............. E06B 2009/3222; E06B 9/322; E06B 2009/2627; E06B 2009/285; E06B 9/326; E06B 9/78; E06B 9/262; E06B 2009/2625; E06B 2009/2622; E06B 2009/785; E06B 2009/262; H02G 1/06

See application file for complete search history.

(56) References Cited

U.S. PATENT DOCUMENTS 403,231 A * 5/1889 Watson .............. A47G 25/0685 211/99
676,710 A * 6/1901 Yost .......................... E06B 9/40 160/261
909,729 A * 1/1909 Wollam ..................... B25J 1/04 294/24

(Continued)

FOREIGN PATENT DOCUMENTS

CN 2841930 Y * 1/2006 ............... E06B 9/78
CN 2841930 Y 11/2006

(Continued)

OTHER PUBLICATIONS

Taiwanese Office Action, dated Sep. 28, 2022, in a counterpart Taiwanese patent application, No. TW 111103490. (English translation of the search report is attached.).

(Continued)

*Primary Examiner* — Johnnie A. Shablack
(74) *Attorney, Agent, or Firm* — Chen Yoshimura LLP

(57) ABSTRACT

An operating wand for a window shade includes an elongate rod extending along a lengthwise axis, a catching portion protruding along the lengthwise axis from an end of the elongate rod, and a shoulder portion protruding sideways from the catching portion. The operating wand is operable to connect with and detach from a rail of a window shade. In particular, an end of the operating wand provided with the catching portion and the shoulder portion can engage with the rail for pushing or pulling the rail in movement so as to collapse or expand the window shade.

12 Claims, 7 Drawing Sheets

(56) References Cited

U.S. PATENT DOCUMENTS

| | | | | | |
|---|---|---|---|---|---|
| 1,020,605 | A * | 3/1912 | Hotaling | E06B 9/42 | 160/246 |
| 1,339,257 | A * | 5/1920 | Callahan | A45B 3/00 | 294/175 |
| 1,345,027 | A * | 6/1920 | Rippe | E04F 10/0648 | 81/484 |
| 1,512,315 | A * | 10/1924 | Sandford | A47G 25/02 | 294/24 |
| 2,063,583 | A * | 12/1936 | Christy | E05F 9/00 | 294/175 |
| 2,084,617 | A * | 6/1937 | Kehl | H01H 31/006 | 81/488 |
| RE20,737 | E * | 5/1938 | Kehl | H01H 31/006 | 81/3.8 |
| 2,251,624 | A * | 8/1941 | Foree | A01G 13/0206 | 47/29.6 |
| 2,275,903 | A * | 3/1942 | Hermann | H01H 85/0208 | 81/3.8 |
| 2,552,631 | A * | 5/1951 | Jilbert | A47L 13/30 | 222/174 |
| 2,716,570 | A * | 8/1955 | Beeman | B25J 1/04 | 294/23 |
| 2,889,797 | A * | 6/1959 | Fox | B63B 21/54 | 114/221 R |
| 3,724,297 | A * | 4/1973 | Bucko | B67B 7/403 | 294/26 |
| 3,936,088 | A * | 2/1976 | Williams | B25J 1/04 | 294/24 |
| 4,153,286 | A * | 5/1979 | Piper | A47G 7/02 | 294/24 |
| 4,593,737 | A * | 6/1986 | Clemente | E06B 9/262 | 160/84.06 |
| 4,669,232 | A * | 6/1987 | Wyatt | E04D 13/076 | 52/12 |
| 4,869,408 | A * | 9/1989 | Lutz | B62J 9/27 | 224/438 |
| 4,941,253 | A * | 7/1990 | Meagher | B60B 29/001 | 29/273 |
| 5,060,995 | A * | 10/1991 | Goldstein | E06B 9/76 | 81/177.1 |
| 5,816,558 | A * | 10/1998 | Sommer | A01K 39/00 | 248/303 |
| 5,979,956 | A * | 11/1999 | Pegram, Sr. | B25J 1/04 | 294/174 |
| 5,996,671 | A * | 12/1999 | Anderson | E06B 9/365 | 160/178.1 R |
| 6,089,303 | A * | 7/2000 | Metcalf | E06B 9/307 | 74/424.77 |
| 6,425,614 | B1 * | 7/2002 | Limber | B25B 9/00 | 248/219.2 |
| 7,389,565 | B2 * | 6/2008 | Cheng | E06B 9/262 | 16/422 |
| 7,429,067 | B1 * | 9/2008 | Rosa | F21S 4/10 | 248/303 |
| 7,478,851 | B2 * | 1/2009 | Geller | B25G 1/04 | 294/24 |
| 7,673,414 | B1 * | 3/2010 | Ivey | A01K 83/06 | 43/4.5 |
| 7,748,430 | B1 * | 7/2010 | Hung | E06B 9/262 | 160/84.01 |
| 7,793,701 | B2 * | 9/2010 | Liang | E06B 9/322 | 294/209 |
| 7,818,914 | B1 * | 10/2010 | Baiamonte | A01K 97/18 | 43/53.5 |
| D633,980 | S * | 3/2011 | Patterson | D22/134 | |
| 8,641,110 | B1 * | 2/2014 | Perry | A47F 13/06 | 294/24 |
| 8,887,786 | B2 * | 11/2014 | Anderson | E06B 9/32 | 160/167 R |
| 8,915,529 | B1 * | 12/2014 | Bond | B25G 1/04 | 294/209 |
| 9,227,317 | B1 * | 1/2016 | Conley | B25B 33/00 | |
| D750,447 | S * | 3/2016 | Tincher | D7/620 | |
| 9,482,048 | B2 * | 11/2016 | Anderson | E06B 9/325 | |
| 9,750,235 | B1 * | 9/2017 | Thornton | A01K 99/00 | 43/17.2 |
| 9,885,208 | B1 * | 2/2018 | Chen | E06B 9/42 | |
| 10,004,944 | B2 * | 6/2018 | Wang | A63B 1/00 | |
| 10,145,171 | B2 * | 12/2018 | Anderson | E06B 9/325 | |
| D864,681 | S * | 10/2019 | Bolster | D8/14 | |
| 10,538,961 | B2 * | 1/2020 | Chen | E06B 9/322 | |
| 10,561,567 | B2 * | 2/2020 | Lopez | A45B 9/04 | |
| 10,843,312 | B2 * | 11/2020 | van Slooten | B25B 11/002 | |
| 2007/0084567 | A1 * | 4/2007 | Chen | E06B 9/32 | 160/84.05 |
| 2007/0151059 | A1 * | 7/2007 | Petner | A47L 13/24 | 15/145 |
| 2008/0216967 | A1 * | 9/2008 | Liang | E06B 9/326 | 160/168.1 V |
| 2009/0020240 | A1 * | 1/2009 | Liang | E06B 9/262 | 160/405 |
| 2009/0159221 | A1 * | 6/2009 | Liang | E06B 9/262 | 160/340 |
| 2009/0194242 | A1 * | 8/2009 | Liang | E06B 9/262 | 160/340 |
| 2009/0308546 | A1 * | 12/2009 | Liang | E06B 9/262 | 160/340 |
| 2015/0075729 | A1 * | 3/2015 | Anderson | E06B 9/322 | 160/193 |
| 2017/0044795 | A1 * | 2/2017 | Nelson | E05B 1/0053 | |
| 2017/0191311 | A1 * | 7/2017 | Mullet | E06B 9/68 | |
| 2017/0298688 | A1 * | 10/2017 | Chen | E06B 9/322 | |
| 2019/0040676 | A1 * | 2/2019 | Mullet | E06B 9/322 | |
| 2022/0349251 | A1 * | 11/2022 | Qu | E06B 9/36 | |
| 2023/0151691 | A1 * | 5/2023 | Ng | E06B 9/42 | 16/427 |

FOREIGN PATENT DOCUMENTS

| | | | | | |
|---|---|---|---|---|---|
| CN | 205840734 | U | | 12/2016 | |
| CN | 107939265 | A | | 4/2018 | |
| CN | 209637642 | U | * | 11/2019 | E06B 9/68 |
| CN | 209637642 | U | | 11/2019 | |
| JP | H073223 | U | * | 1/1995 | H02G 1/06 |
| JP | H073223 | U | | 1/1995 | |
| TW | M580389 | U | | 7/2019 | |

OTHER PUBLICATIONS

International Search Report in the parent PCT application No. PCT/US2022/014007, dated Apr. 22, 2022.
Written Opinion in the parent PCT application No. PCT/US2022/014007, dated Apr. 22, 2022.

* cited by examiner

WINDOW SHADE AND OPERATING WAND THEREOF

CROSS-REFERENCE TO RELATED APPLICATION(S)

This application claims priority to U.S. provisional patent application No. 63/144,581 filed on Feb. 2, 2021, the disclosure of which is hereby incorporated by reference.

BACKGROUND

1. Field of the Invention

The present invention relates to window shades and operating wands for window shades.

2. Description of the Related Art

Vertical window shades can typically include a head rail, a bottom rail suspended from the head rail, and a shading structure disposed between the head rail and the bottom rail. The vertical window shade can be installed in a room with the head rail attached at a top of a window opening. During use, the bottom rail may be displaced toward and away from the head rail for collapsing and expanding the shading structure. When the bottom rail is displaced toward the head rail, the bottom rail may be located at a height that is not easily accessible for operation by a user.

SUMMARY

The present application describes an operating wand that can facilitate operation of a window shade.

According to one aspect, the operating wand includes an elongate rod extending along a lengthwise axis, a catching portion protruding along the lengthwise axis from an end of the elongate rod, and a shoulder portion protruding sideways from the catching portion.

Moreover, the present application describes a window shade that includes a first rail and a second rail, a shading structure and an operating wand. The shading structure is disposed between the first rail and the second rail, the second rail being movable toward the first rail for collapsing the shading structure and away from the first rail for expanding the shading structure. The operating wand is operable to connect with and detach from the second rail, the operating wand having an end configured to engage with the second rail for pushing the second rail toward the first rail and for pulling the second rail away from the first rail, wherein the operating wand includes an elongate rod extending along a lengthwise axis, and the end of the operating wand has a catching portion and a shoulder portion, the catching portion protruding along the lengthwise axis from an end of the rod, and the shoulder portion protruding sideways from the catching portion.

DETAILED DESCRIPTION OF THE EMBODIMENTS

Figure 1:
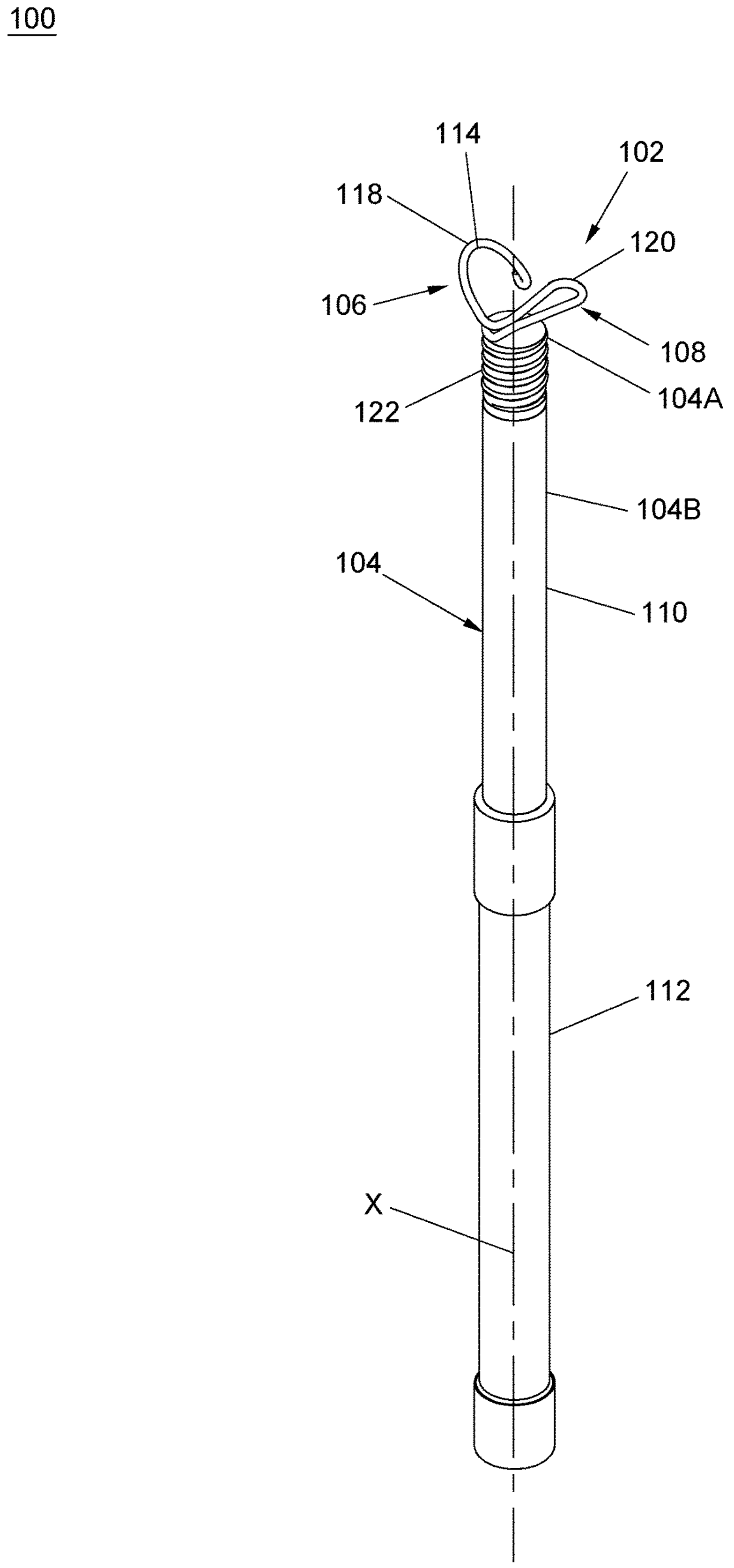
FIG. 1 is a perspective view illustrating an embodiment of an operating wand suitable for use with a window shade.
Figure 2:
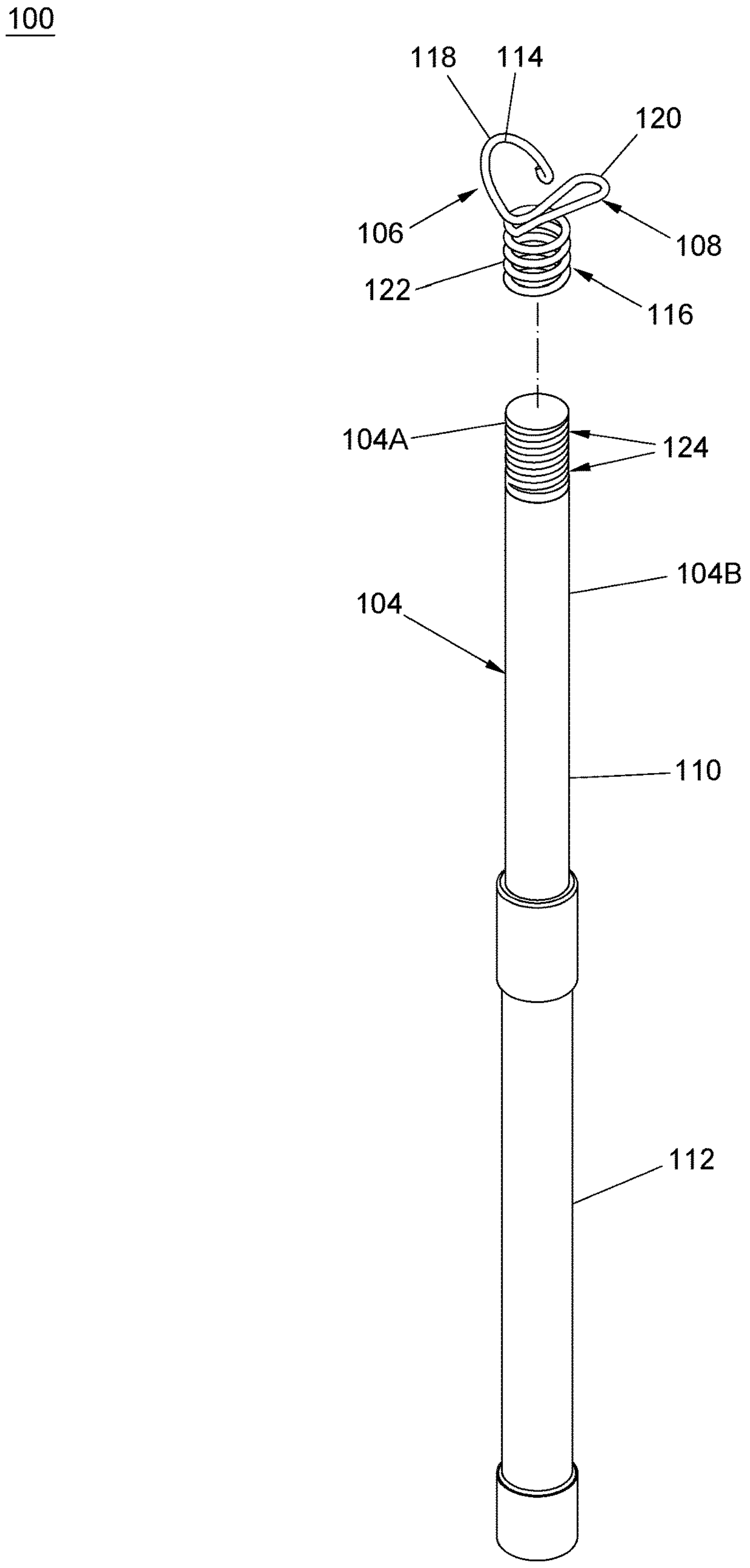
FIG. 2 is a partially exploded view of the operating wand shown in FIG. 1.

FIG. 1 is a perspective view illustrating an embodiment of an operating wand 100 suitable for use with a window shade, and FIG. 2 is a partially exploded view of the operating wand 100. Referring to FIGS. 1 and 2, the operating wand 100 has an end 102 configured to engage with a rail of a window shade for pushing and pulling the rail in movement. More specifically, the operating wand 100 can include an elongate rod 104, and a catching portion 106 and a shoulder portion 108 provided at the end 102 of the operating wand 100.

The rod 104 extends along a lengthwise axis X, and can have any suitable length for facilitating operation of a window shade with the operating wand 100. According to an example of construction, the rod 104 can include a plurality of rod segments 110 and 112 telescopically connected with one another so that the length of the operating wand 100 can be adjusted as desired. According to another example of construction, the rod 104 may be formed by one single rod segment so that the rod 104 has a fixed length. The operating wand 100 may be used by grasping the rod 104 with one hand.

The catching portion 106 and the shoulder portion 108 can be provided at an end 104A of the rod 104. More specifically, the catching portion 106 can protrude along the lengthwise axis X from the end 104A of the rod 104, and the shoulder portion 108 can protrude sideways from the catching portion 106. The catching portion 106 has a profile that is thinner that the rod 104, and can have any shape adapted to engage with a rail of a window shade. For example, the catching portion 106 can include a hook shape having a concavity 114 oriented toward the rod 104. The shoulder portion 108 can be disposed between the rod 104 and the catching portion 106, and can protrude sideways from a circumference 104B of the rod 104. For example, the shoulder portion 108 can protrude substantially perpendicular to the rod 104, and the catching portion 106 can extend at an angle away from the shoulder portion 108. The angle between the catching portion 106 and the shoulder portion 108 can be exemplarily 90 degrees or greater.

Various constructions may be applied for the catching portion 106 and the shoulder portion 108. For example, the catching portion 106 and the shoulder portion 108 may be integrally formed as one single part, or may be two individual parts fixedly attached to each other. According to an example of construction, any of the catching portion 106 and the shoulder portion 108 may include a bent wire, which may include, without limitation, bent wires made of metallic materials. Wire bending may allow to easily form desirable shapes in a cost-effective manner.

According to an embodiment, the catching portion 106 and the shoulder portion 108 can be integrally formed by a single bent wire 116, as shown in FIGS. 1 and 2. The bent wire 116 can include two bend portions 118 and 120 that respectively form the catching portion 106 and the shoulder portion 108, and a coiled portion 122 that is tightly disposed around the end 104A of the rod 104 for fixedly connecting the catching portion 106 and the shoulder portion 108 to the rod 104. The bend portion 120 can be an intermediate portion of the bent wire 116 that protrudes sideways from the coiled portion 122. The bend portion 118 can extend at an angle from the bend portion 120, and form a hook shape having the concavity 114 oriented toward the rod 104. The end 104A of the rod 104 may exemplarily have a plurality of grooves 124 where the coiled portion 122 can tightly engage for attaching the bent wire 116 to the rod 104.

Figure 3:
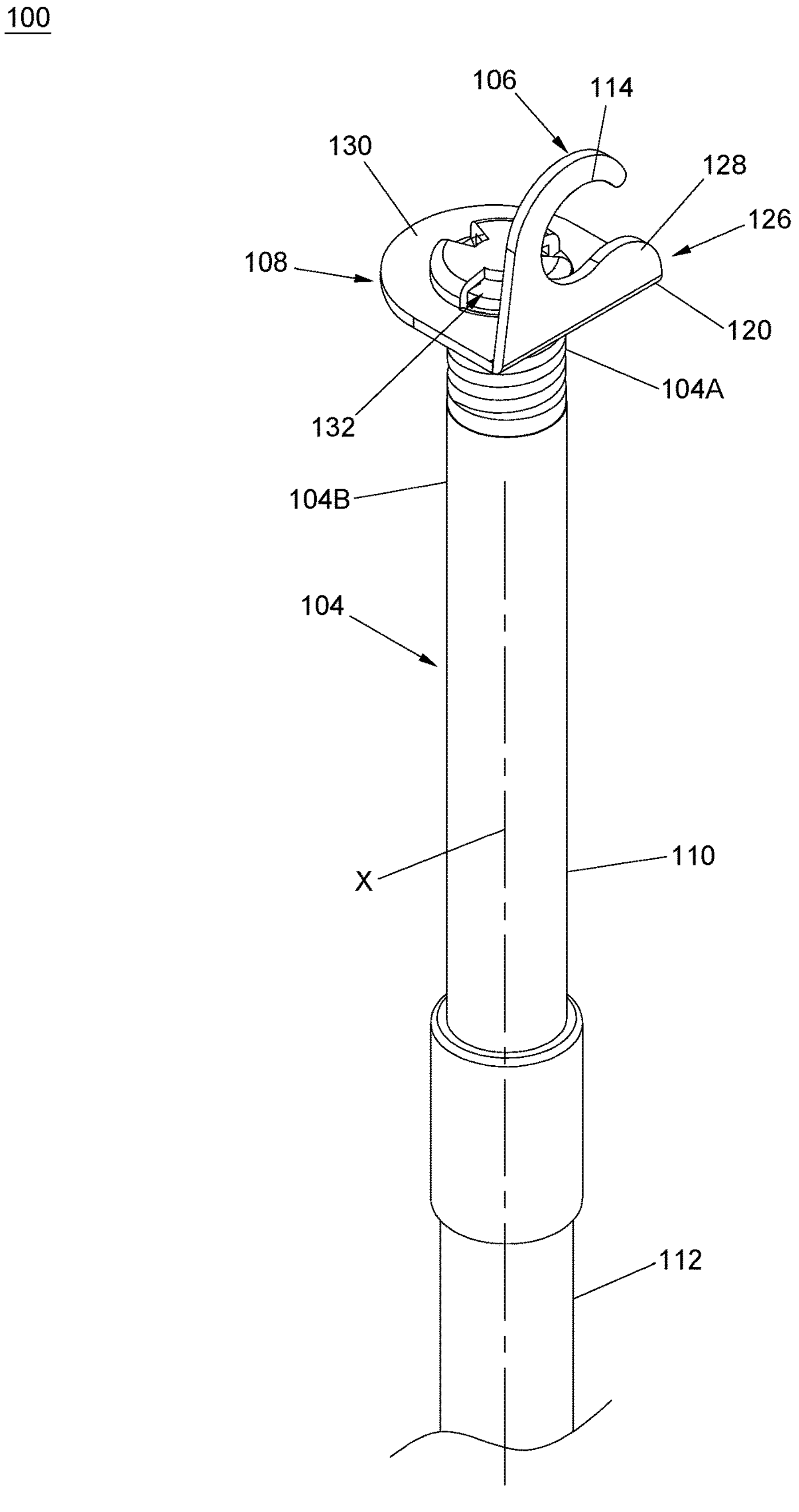
FIG. 3 is a perspective view illustrating a variant construction of the operating wand.

FIG. 3 is a perspective view illustrating a variant construction of the operating wand 100 in which the catching portion 106 and the shoulder portion 108 are integrally formed by a single plate 126. Examples of suitable materials for the plate 126 may include, without limitation, metallic materials, plastic materials, and the like. The plate 126 can be fixedly connected with the rod 104, and can bend to define two plate portions 128 and 130 that respectively form the catching portion 106 and the shoulder portion 108. For example, the plate 126 can bend so that the two plate portions 128 and 130 extend substantially perpendicular to each other. The plate portion 128 may include a hook shape for facilitating engagement of the catching portion 106 with a rail of window shade, the hook shape having the concavity 114 oriented toward the rod 104. The plate portion 130 may be fixedly fastened to the end 104A of the rod 104, and protrude sideways from the circumference 104B of the rod 104. For facilitating the attachment of the plate 126 to the rod 104, the plate portion 130 can have a concavity 132 in which the end 104A of the rod 104 can be received for attachment. For example, the end 104A of the rod 104 can be tightly engaged into the concavity 132 for attaching the plate 126 to the rod 104.

Figure 4:
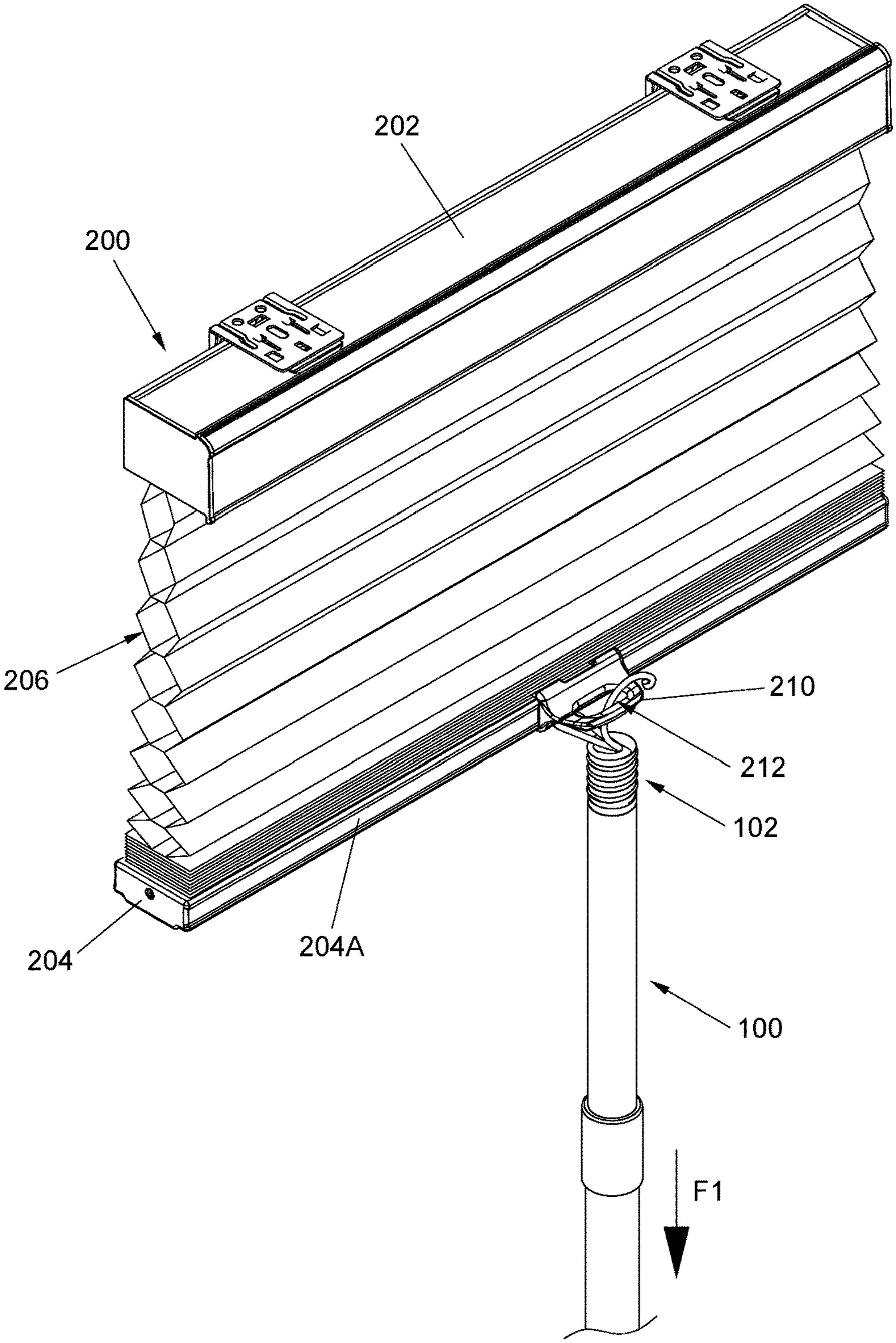
FIG. 4 is a perspective view illustrating an embodiment of a window shade.

FIG. 4 is perspective view illustrating an embodiment of a window shade 200. Referring to FIGS. 1, 2 and 4, the window shade 200 can include two rails 202 and 204, a shading structure 206 disposed between the two rails 202 and 204, and the operating wand 100. The two rails 202 and 204 may have any suitable elongate shapes. The rail 202 may be exemplarily a head rail adapted to attach to a top of a window opening, and the rail 204 may exemplarily be a bottom rail. The shading structure 206 may have any suitable structures, which may include, without limitation, cellular structures, slats, panel structures, etc. During use, the rail 204 is movable toward the rail 202 for collapsing the shading structure 206 and away from the rail 202 for expanding the shading structure 206.

The operating wand 100 is operable to connect with and detach from the rail 204. More specifically, the end 102 of the operating wand 100 can be engaged with the rail 204 so that the rail 204 can be pushed toward and pulled away from the rail 202 with the operating wand 100. The operating wand 100 can thereby facilitate operation of the rail 204 when the rail 204 is located at a height that is not easily accessible for a user. When the operating wand 100 is not used, the end 102 of the operating wand 100 may be detached from the rail 204 for removing the operating wand 100.

For facilitating the engagement of the operating wand 100 with the rail 204, the rail 204 may have a handle portion 210 provided with an opening 212. The handle portion 210 can be fixedly connected with the rail 204, and can protrude from a lengthwise edge 204A of the rail 204 at a central location thereof. The opening 212 may be exemplarily a hole formed through the handle portion 210. The end 102 of the operating wand 100 can be engaged with the rail 204 with the catching portion 106 disposed through the opening 212 of the handle portion 210 and the shoulder portion 108 positioned adjacent to an underside of the rail 204.

Figure 5:
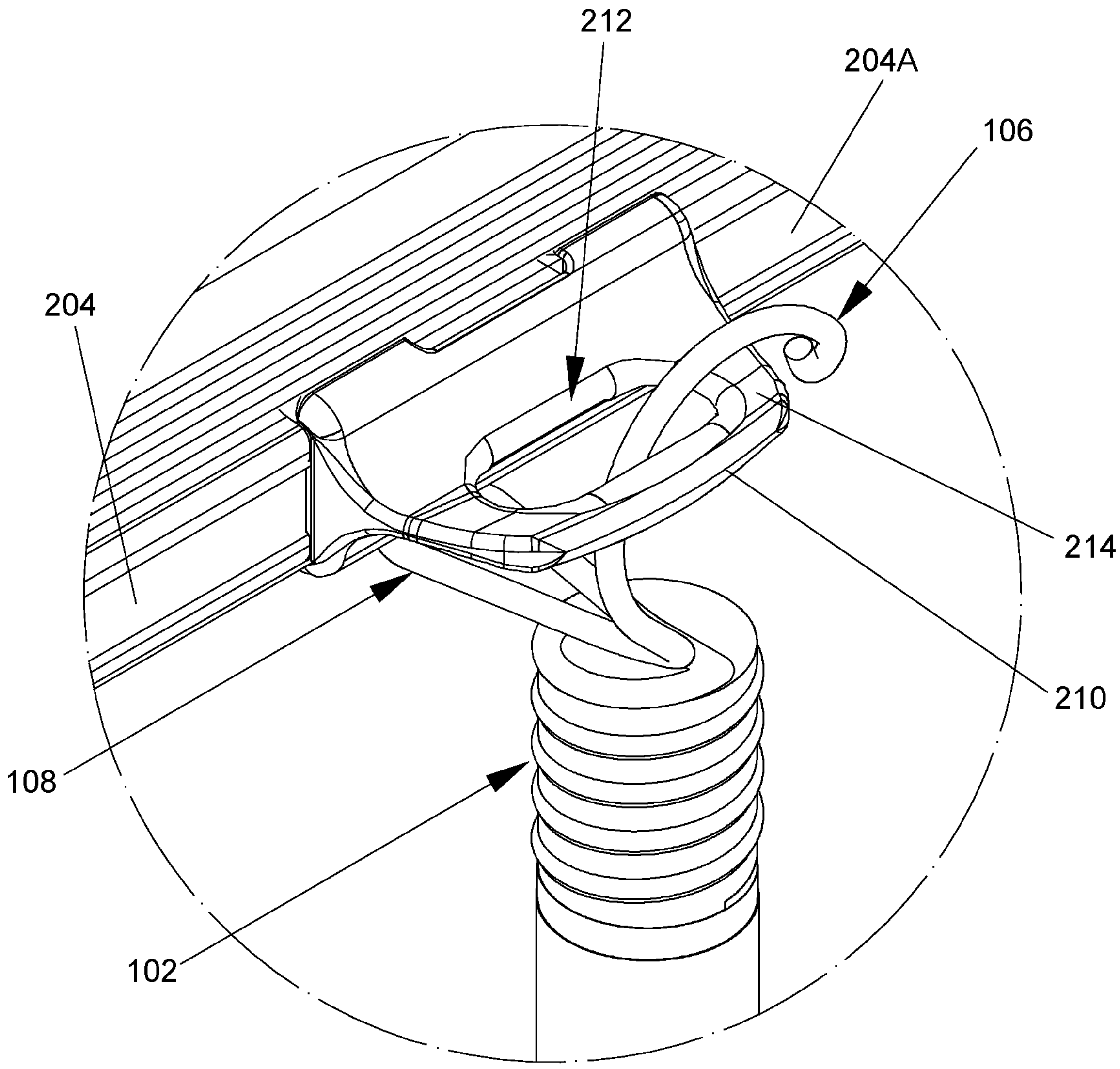
FIG. 5 is an enlarged view of a portion shown in FIG. 4.

Referring to FIGS. 4 and 5, the catching portion 106 may contact with an upper surface 214 of the handle portion 210 when the rail 204 is pulled away from the rail 202 with the operating wand 100 for expanding the shading structure 206. In particular, the hook shape of the catching portion 106 may facilitate its engagement with the upper surface 214 of the handle portion 210 so that drawing the operating wand 100 in a direction F1 away from the rail 202 can pull the rail 204 to move in the same direction.

Figure 6:
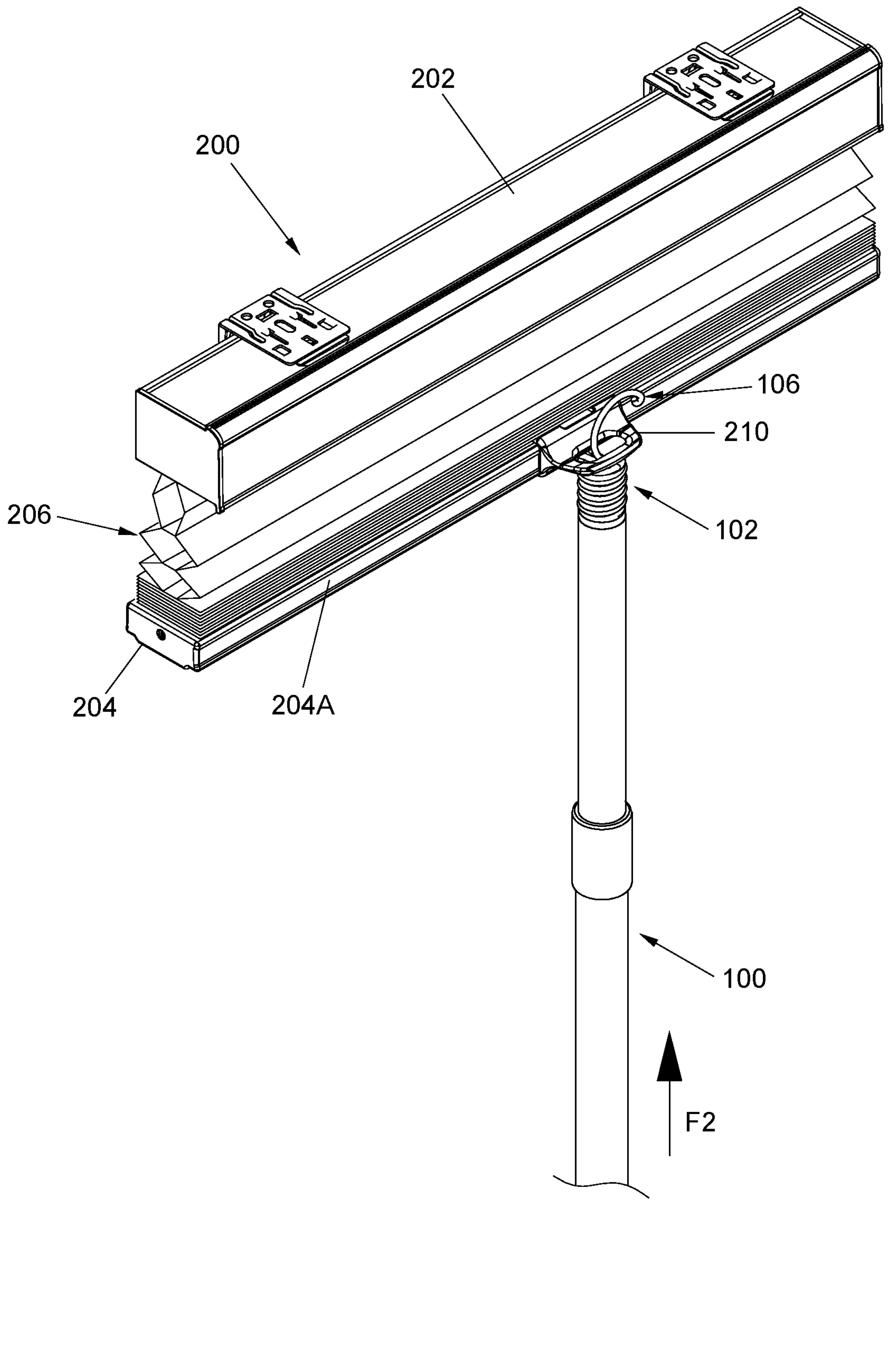
FIG. 6 is a perspective view illustrating exemplary operation for collapsing the window shade.
Figure 7:
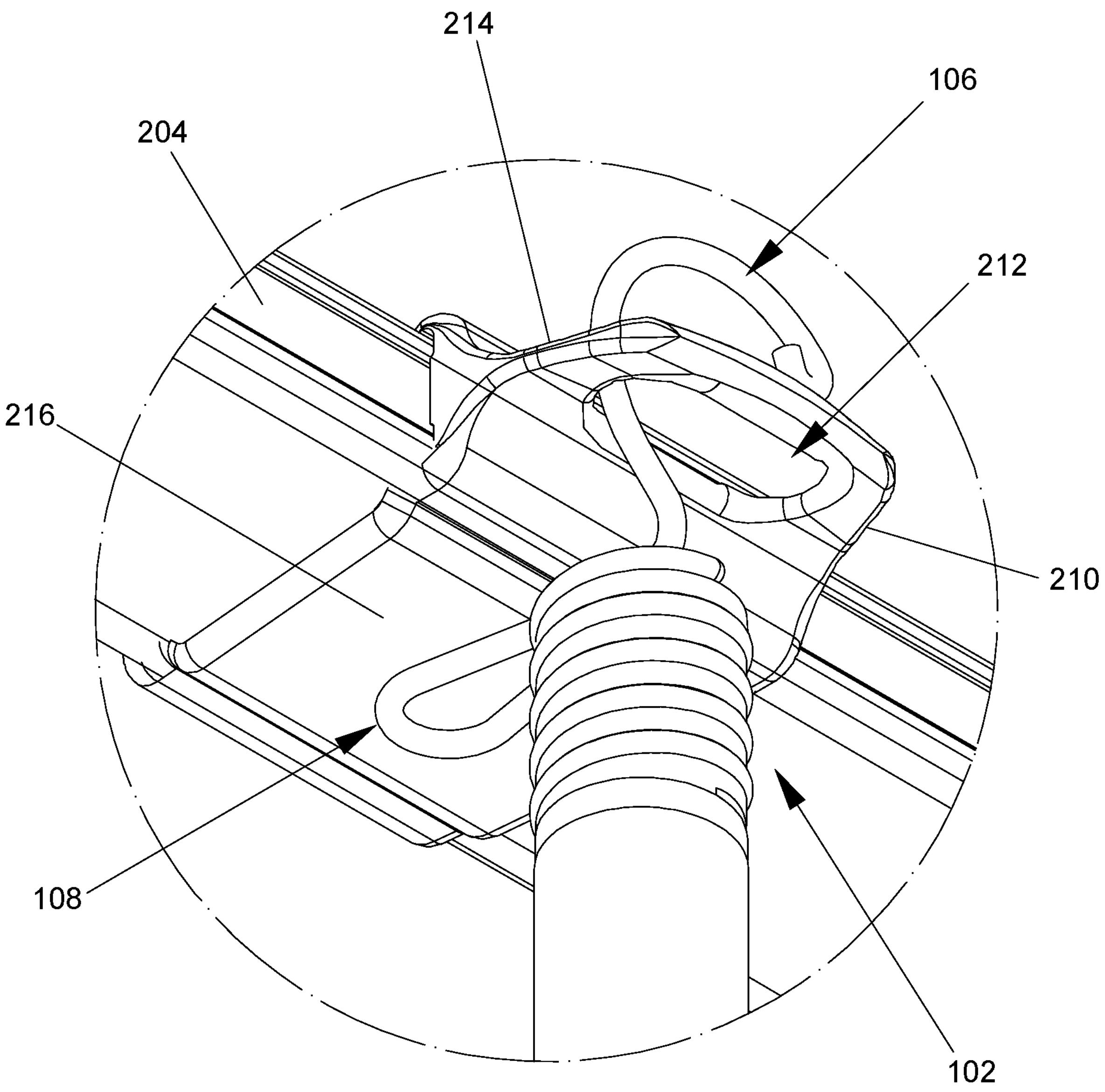
FIG. 7 is an enlarged view illustrating a connection of the operating wand with a rail of the window shade at an underside thereof.

Referring to FIGS. 6 and 7, the shoulder portion 108 can contact with a lower surface 216 at an underside of the rail 204 when the rail 204 is pushed toward the rail 202 with the operating wand 100 for collapsing the shading structure 206. In particular, the sideways extension of the shoulder portion 108 can facilitate its engagement with the lower surface 216 so that displacing the operating wand 100 in a direction F2 toward the rail 202 can push the rail 204 to move in the same direction. The lower surface 216 can be exemplarily a lower surface of the handle portion 210 that extends at the underside of the rail 204. According to an example of construction, the catching portion 106 can be out of contact with the upper surface 214 of the handle portion 210 when the shoulder portion 108 contacts with the lower surface 216, and the shoulder portion 108 can be out of contact with the lower surface 216 when the catching portion 106 contacts with the upper surface 214 of the handle portion 210.

When the operating wand 100 is not used, the catching portion 106 can be disengaged from the opening 212 of the handle portion 210 for removal of the operating wand 100 from the rail 204.

Although FIGS. 4-7 illustrate an example where the operating wand 100 engaged with the rail 204 of the window shade 200 has the construction shown in FIGS. 1 and 2, it will be appreciated that the operating wand 100 having the construction shown in FIG. 3 may be likewise used for operating the window shade 200 in a same way.

Advantages of the structures described herein include the ability to provide an operating wand that facilitates operation of a window shade and can be fabricated in cost-effective manner. The operating wand can be engaged with or detached from a rail of the window shade according to the needs, which can provide convenient and flexible use.

Realizations of the structures have been described only in the context of particular embodiments. These embodiments are meant to be illustrative and not limiting. Many variations, modifications, additions, and improvements are possible. These and other variations, modifications, additions, and improvements may fall within the scope of the claims that follow.

What is claimed is:

1. A window shade comprising:
   - a first rail and a second rail, the second rail having a handle portion provided with an opening, the opening in the handle portion being located at a front side of the second rail;
   - a shading structure disposed between the first rail and the second rail, the second rail being movable toward the first rail for collapsing the shading structure and away from the first rail for expanding the shading structure; and
   - an operating wand operable to connect with and detach from the second rail, the operating wand having an end configured to engage with the second rail for pushing the second rail toward the first rail and for pulling the second rail away from the first rail, wherein the operating wand includes an elongate rod extending along a lengthwise axis, and the end of the operating wand has a catching portion and a shoulder portion, the catching portion protruding along the lengthwise axis from an end of the rod, and the shoulder portion protruding sideways from the catching portion;

wherein the catching portion and the shoulder portion are formed by a single wire including a first and a second bend portion, the first bend portion being bent into a hook shape that forms the catching portion, the second bend portion being bent into a loop that protrudes sideways substantially perpendicular from a circumference of the rod and forms the shoulder portion, and the operating wand is connectible with the second rail by introducing the catching portion through the opening of the handle portion with the shoulder portion extending under the second rail.

2. The window shade according to claim 1, wherein the handle portion protrudes from a lengthwise edge of the second rail at a central location thereof, and the opening is a hole formed through the handle portion.

3. The window shade according to claim 1, wherein the rod includes a plurality of rod segments telescopically connected with one another.

4. The window shade according to claim 1, wherein the single wire further includes a coiled portion for fixedly connecting the catching portion and the shoulder portion with the end of the rod.

5. The window shade according to claim 1, wherein the loop extends in a radially outward direction from the circumference of the rod.

6. An operating wand for a window shade, comprising:

an elongate rod extending along a lengthwise axis;

a catching portion protruding along the lengthwise axis from an end of the elongate rod; and a shoulder portion protruding sideways from the catching portion;

wherein the operating wand is operable to connect with and detach from a rail of the window shade, the catching portion and the shoulder portion are formed by a single wire including a first and a second bend portion, the first bend portion being bent into a hook shape that forms the catching portion, the second bend portion being bent into a loop that extends in a radially outward direction from a circumference of the rod and forms the shoulder portion.

7. The operating wand according to claim 6, wherein the single wire further includes a coiled portion for fixedly connecting the catching portion and the shoulder portion with the end of the elongate rod.

8. The operating wand according to claim 6, wherein the single wire terminates at a wire end that is located at a distal end of the hook shape.

9. An operating wand for a window shade, comprising:

an elongate rod extending along a lengthwise axis;

a catching portion protruding along the lengthwise axis from an end of the elongate rod; and a shoulder portion protruding sideways from the catching portion;

wherein the operating wand is operable to connect with and detach from a rail of the window shade, the catching portion and the shoulder portion are formed by a single plate that is fixedly connected with the rod so that the rod is operable to have the catching portion and the shoulder portion engaged with and detached from the rail of the window shade, the single plate having an edge along which the single plate bends to define a first plate portion and a second plate portion that are connected to each other along the edge of the single plate, the first plate portion including a hook shape that has a distal end bent in a first direction toward the edge of the single plate and forms the catching portion, the second plate portion protruding sideways from a circumference of the rod in a second direction different from the first direction and forming the shoulder portion.

10. The operating wand according to claim 9, wherein the second plate portion has a concavity in which the end of the rod is received for attachment.

11. The operating wand according to claim 9, wherein the single plate has a L-shape, the catching portion including the hook shape forming a first section of the L-shape, the shoulder portion forming a second section of the L-shape intersecting the first section of the L-shape at a substantially perpendicular angle.

12. The operating wand according to claim 9, wherein the hook shape is positioned at a front side of the rail while the shoulder portion faces a bottom of the rail to engage the operating wand with the rail.

* * * * *